United States Patent
Komiyama

(10) Patent No.: US 9,473,210 B2
(45) Date of Patent: *Oct. 18, 2016

(54) POWER TRANSMITTING DEVICE, NON-CONTACT POWER TRANSMITTING SYSTEM, AND SIGNAL GENERATING METHOD

(71) Applicant: Sony Corporation, Tokyo (JP)

(72) Inventor: Shinji Komiyama, Saitama (JP)

(73) Assignee: Sony Corporation, Tokyo (JP)

( * ) Notice: Subject to any disclaimer, the term of this patent is extended or adjusted under 35 U.S.C. 154(b) by 552 days.

This patent is subject to a terminal disclaimer.

(21) Appl. No.: 13/861,418

(22) Filed: Apr. 12, 2013

(65) Prior Publication Data

US 2013/0278071 A1 Oct. 24, 2013

(30) Foreign Application Priority Data

Apr. 19, 2012 (JP) .................................. 2012-095781

(51) Int. Cl.
| | |
|---|---|
| H04B 5/00 | (2006.01) |
| H02J 5/00 | (2016.01) |
| H01F 38/14 | (2006.01) |
| F02N 11/08 | (2006.01) |
| B60R 16/03 | (2006.01) |

(52) U.S. Cl.
CPC .............. *H04B 5/0037* (2013.01); *B60R 16/03* (2013.01); *F02N 11/087* (2013.01); *F02N 2011/0874* (2013.01)

(58) Field of Classification Search
CPC .......... H02J 17/00; H02J 5/005; H02J 7/025; H02J 3/01; H01F 38/14; B60L 11/182; B60L 11/1829; B60L 11/1831; Y02T 90/122; H04B 5/0037

USPC ........................................................ 307/304
See application file for complete search history.

(56) References Cited

U.S. PATENT DOCUMENTS

| | | | |
|---|---|---|---|
| 6,208,537 B1* | 3/2001 | Skibinski et al. .............. 363/40 |
| 2010/0328974 A1* | 12/2010 | Kenny et al. ................. 363/126 |
| 2013/0128638 A1* | 5/2013 | Irish .............................. 363/126 |
| 2013/0278070 A1* | 10/2013 | Komiyama ................... 307/104 |

FOREIGN PATENT DOCUMENTS

JP        2011-120216 A        6/2011

* cited by examiner

*Primary Examiner* — Jung Kim
*Assistant Examiner* — Rafael Pacheco
(74) *Attorney, Agent, or Firm* — Chip Law Group

(57) ABSTRACT

A power transmitting device includes a resonance circuit, a first signal generating unit, and a second signal generating unit. The resonance circuit is used in non-contact power transmission. The first signal generating unit is connected to one end of the resonance circuit, and generates, with the use of a switching system, a first high-frequency signal including one or more harmonic components. The second signal generating unit is connected to an other end of the resonance circuit, and generates, with the use of a switching system, a second high-frequency signal including a specific harmonic component. The first high-frequency signal is adjusted in pulse width and input to the one end of the resonance circuit, and the second high-frequency signal is adjusted in pulse width and phase difference from the first high-frequency signal and input to the other end of the resonance circuit.

8 Claims, 16 Drawing Sheets

POWER TRANSMITTING DEVICE, NON-CONTACT POWER TRANSMITTING SYSTEM, AND SIGNAL GENERATING METHOD

BACKGROUND

The present disclosure relates to, for example, a power transmitting device which transmits power in a non-contact manner, a non-contact power transmitting system, and a signal generating method.

In non-contact power transmission (so-called wireless power feeding), it is necessary to output a high-power sine wave signal from a power transmitting device. A device which generates such a sine wave signal is called a high-frequency power source. For example, in a low-frequency, low-output audio power amplifier or the like not demanding a power exchange efficiency from a high-frequency power source to a sine wave signal, it is easy to change the signal level of the sine wave signal output from the high-frequency power source. In a high-frequency, high-output high-frequency power source used in wireless power feeding demanding a high power exchange efficiency, however, it is difficult to change the output power. In general, therefore, an inverter which generates a square wave through a switching operation capable of obtaining a high efficiency with a simple circuit configuration is used in many cases.

For example, highly efficient high-frequency power sources applicable to a non-contact power transmitting system include a Class-E amplifier (Class-E inverter), a half-bridge inverter, and a full-bridge inverter (so-called H-bridge circuit).

An overview of a power transmitting device using a common high-frequency power source will be described with reference to FIG. 1. FIG. 1 is a schematic circuit diagram for describing a common high-frequency power source using a half-bridge inverter.

As an example of the simplest configuration, the power transmitting device illustrated in FIG. 1 includes, for example, a high-frequency power source 101 and a resonance circuit 104 (series resonance circuit) including a power transmitting coil 102 and a resonance capacitor 103. The high-frequency power source 101 uses a half-bridge inverter as a signal generator. Since the configuration of the half-bridge inverter is common, a detailed circuit configuration thereof is omitted. The high-frequency power source 101 generates a square wave signal as a high-frequency output signal, and supplies the square wave signal to the resonance circuit 104.

All of the above high-frequency power sources, however, are inverters which generate the square wave in accordance with a switching system. The square wave corresponding to the output signal of the inverters includes a large number of harmonics, which lead to unnecessary radiation from the power transmitting device.

Japanese Unexamined Patent Application Publication No. 2011-120216 discloses an antenna drive including a trapezoidal wave signal generating circuit which generates a trapezoidal wave signal from a square wave signal having a predetermined frequency and a trapezoidal wave signal amplifier circuit which amplifies and supplies the trapezoidal wave signal to an antenna load. In this antenna drive, the trapezoidal wave signal amplifier circuit supplies a positive-phase output signal and a reverse-phase output signal, which are reversed in phase from each other, to the opposite ends of the antenna load, to thereby double the voltage applied to the load.

SUMMARY

If an alternating-current signal including a harmonic component is supplied to a power transmitting coil of a power transmitting device, unnecessary radiation is caused. Therefore, there is a case in which, even if an industry science medical (ISM) band having a high radiation limit value is selected for the fundamental wave, for example, a harmonic thereof exceeds a standard value. The ISM band is a frequency band specified by the international telecommunication union (ITU) for exclusive use of radio wave as a high-frequency energy source in the industrial, scientific, and medical fields other than radio communication. For example, in the United States, in which the ISM band is set to 6.78 MHz, 13.56 MHz, and 27.12 MHz, if a power feeding signal is set to 6.78 MHz, the third harmonic thereof corresponds to 20.34 MHz in a non-ISM band.

The technique described in the above patent application publication is unable to selectively suppress a specific harmonic component as described above included in the fundamental wave.

In view of the foregoing circumstances, a high-frequency power source capable of selectively suppressing a specific harmonic component has been demanded.

According to an embodiment of the present disclosure, a first signal generating unit generates, with the use of a switching system, a first high-frequency signal including one or more harmonic components and adjusted in pulse width, and a second signal generating unit generates, with the use of a switching system, a second high-frequency signal including a specific harmonic component and adjusted in pulse width and phase difference from the first high-frequency signal. Then, the first high-frequency signal and the second high-frequency signal are differentially driven to generate a composite signal thereof.

According to the embodiment of the present disclosure, with appropriate adjustment of the pulse width of the first high-frequency signal, the pulse width of the second high-frequency signal, and the phase difference of the second high-frequency signal from the first high-frequency signal, a specific harmonic component in a composite signal of the first high-frequency signal and the second high-frequency signal is offset or reduced.

According to the present disclosure, it is possible to selectively offset or reduce a specific harmonic component in the first high-frequency signal, while employing a common switching system.

DETAILED DESCRIPTION OF EMBODIMENTS

Figure 1:
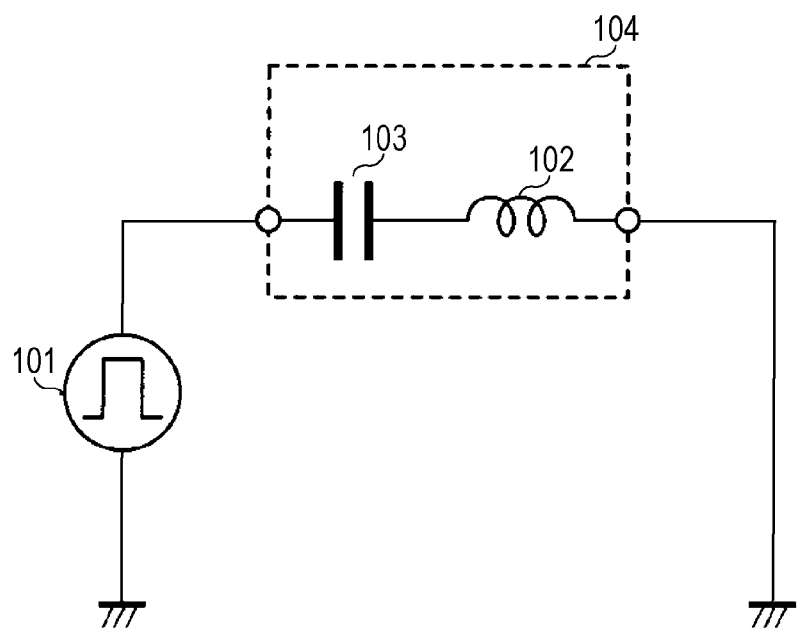
FIG. 1 is a schematic circuit diagram for describing a common high-frequency power source using half-bridge inverters.

Examples of embodiments for implementing the present disclosure (hereinafter referred to as the embodiments) will be described below. In the present specification and drawings, constituent elements having substantially the same functions or configurations are denoted by the same reference numerals, and redundant description thereof will be omitted. Description will be given in the following order: 1. configuration example of power transmitting device, 2. description of signal waveform and frequency component, 3. configuration example of non-contact power transmitting system, and 4. modified examples.

In a power transmitting device (high-frequency power source) according to an embodiment of the present disclosure, a signal generator which generates a high-frequency alternating-current signal (high-frequency signal) in accordance with a switching system is employed at one end of a resonance circuit including a power transmitting coil, and the high-frequency signal is supplied to the one end of the resonance circuit. Meanwhile, the other end of the resonance circuit is connected to a high-frequency power source which generates a high-frequency signal for harmonic cancellation. The two high-frequency power sources are differentially driven to perform subtraction processing on the high-frequency signals supplied to the opposite ends and offset (cancel) or reduce a specific harmonic component (and an odd-order harmonic component).

Figure 2:
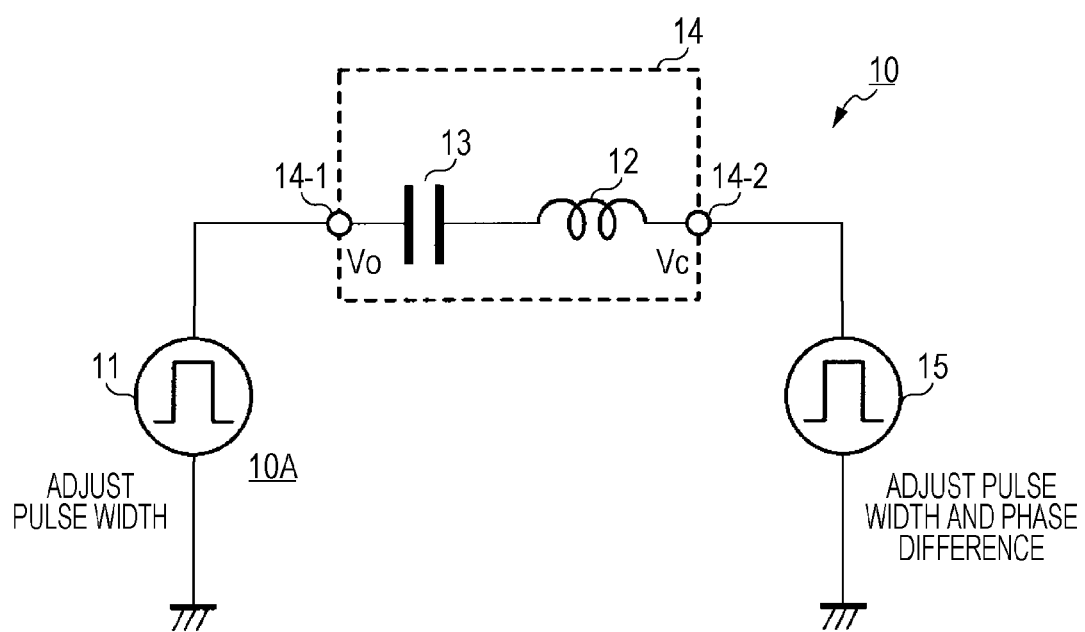
FIG. 2 is a schematic circuit diagram for describing a high-frequency power source according to an embodiment of the present disclosure.

1. Configuration Example of Power Transmitting Device
Overview of Power Transmitting Device FIG. 2 is a schematic circuit diagram for describing a high-frequency power source according to an embodiment of the present disclosure. A power transmitting device 10 includes a high-frequency power source 10A and a resonance circuit 14 (an example of a load) supplied with an alternating-current signal output from the high-frequency power source 10A.

The high-frequency power source 10A includes a signal generator 11 (an example of a first signal generating unit) and a signal generator 15 (an example of a second signal generating unit).

The signal generator 11 generates a substantially square wave signal (first high-frequency signal) in accordance with a switching operation, and supplies the first high-frequency signal to one end of the resonance circuit 14. Under control of a later-described control unit 16 (see FIG. 3), the signal generator 11 generates the first high-frequency signal having a specified frequency (of MHz order, for example), phase, duty ratio, and amplitude.

The signal generator 15 generates a substantially square wave second high-frequency signal having a phase different, by a predetermined amount, from the phase of the first high-frequency signal generated by the signal generator 11, and supplies the second high-frequency signal to the other end of the resonance circuit 14. The signal generator 15 employs, for example, a configuration similar to that of the signal generator 11.

The resonance circuit 14 is a series resonance circuit having a power transmitting coil (primary coil) 12 and a resonance capacitor 13 connected in series. The resonance circuit 14 resonates at a predetermined frequency $f (=1/\{2\pi\sqrt{(LC)}\})$ determined by the inductance value of the power transmitting coil 12 and the capacitance value of the resonance capacitor 13.

The first high-frequency signal output from the signal generator 11 and the second high-frequency signal output from the signal generator 15 are supplied to one end 14-1 and an other end 14-2 of the resonance circuit 14, respectively. The resonance circuit 14 is therefore applied with a composite signal (voltage Vo-Vc) of the first high-frequency signal (voltage Vo) applied to the one end 14-1 and the second high-frequency signal (voltage Vc) applied to the other end 14-2.

The above-described first and second high-frequency signals may each be a high-frequency signal generated by a switching system and including a specific harmonic component. For example, a square wave signal is applicable as an example of a signal including multiple harmonic components. In this case, the square wave signal may be a substantially square wave high-frequency signal considered to have a substantially square wave. For example, the square wave signal includes a signal having a rounded square waveform and a signal having a substantially trapezoidal waveform. That is, if the substantially square wave first high-frequency signal having a deformed waveform and the substantially square wave second high-frequency signal having a deformed waveform and different in phase from the first high-frequency signal by a predetermined amount are supplied to a load (the resonance circuit 14 in this example), and if functions and effects the same as or similar to those of an embodiment of the present disclosure described below are obtained, these high-frequency signals are considered to have a substantially square wave.

Further, the configuration of the resonance circuit 14 serving as an example of a load is not limited to this example. For example, the resonance circuit 14 may have the resonance capacitor 13 arranged to be connected electrically in series, parallel, or series-parallel to the power transmitting coil 12.

For example, the resonance capacitor 13 may be connected electrically in parallel to the power transmitting coil 12, or may be connected electrically in series-parallel to the power transmitting coil 12.

Specific Example of Power Transmitting Device

Figure 3:
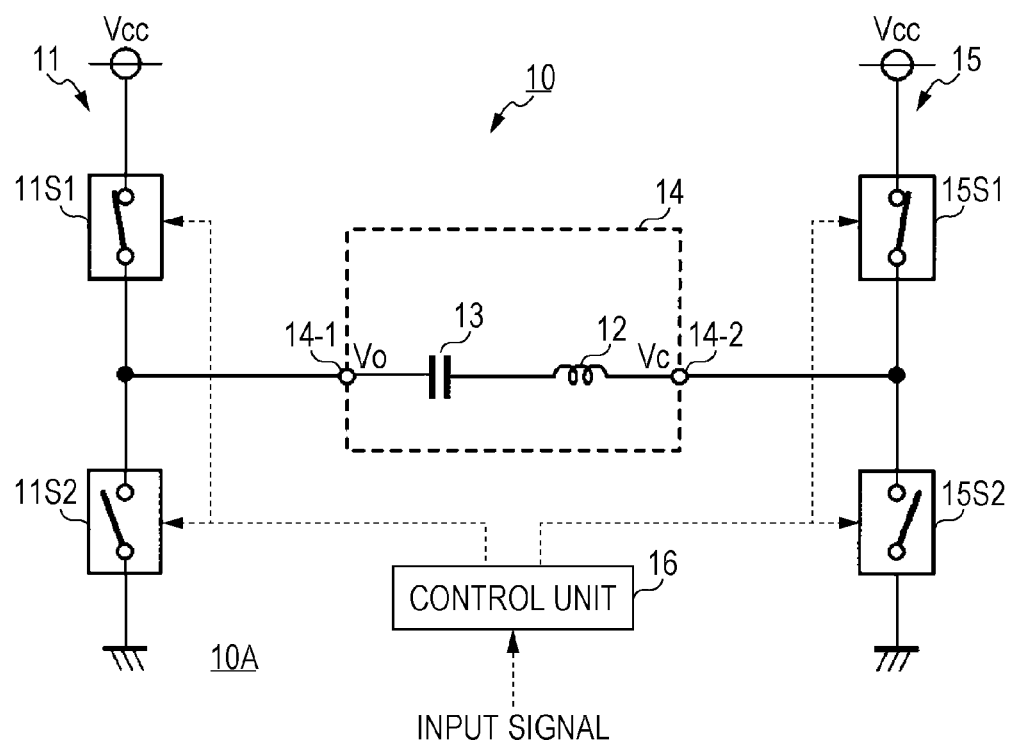
FIG. 3 is a circuit diagram for describing a specific example of the high-frequency power source according to the embodiment of the present disclosure.

FIG. 3 is a circuit diagram for describing a specific example of the high-frequency power source 10A of the power transmitting device 10 in FIG. 2. In this example, a half-bridge inverter is applied to each of the signal generators 11 and 15 included in the high-frequency power source 10A.

The high-frequency power source 10A includes the signal generator 11 which generates the first high-frequency signal, the signal generator 15 which generates the second high-frequency signal, and the control unit 16 which controls driving of the signal generators 11 and 15.

The control unit 16 generates a drive signal on the basis of an input signal (control signal), and supplies the drive signal to the signal generators 11 and 15 to control the occurrence of signals by the signal generators 11 and 15. An arithmetic processor, such as a microcomputer or a central processing unit (CPU), for example, is applied to the control unit 16. The input signal is automatically generated on the basis of, for example, a predetermined set value or execution program, or is generated on the basis of a user operation.

The signal generator 11 is a half-bridge inverter including a switching element 11S1 (an example of a first switching unit) and a switching element 11S2 (an example of a second switching unit) connected in series, and is supplied with a power source voltage Vcc. A connection midpoint between the switching elements 11S1 and 11S2 is connected to the one end 14-1 of the resonance circuit 14.

The signal generator 15 is a half-bridge inverter including a switching element 15S1 (an example of a third switching unit) and a switching element 15S2 (an example of a fourth switching unit) connected in series, and is supplied with a power source voltage Vcc. A connection midpoint between the switching elements 15S1 and 15S2 is connected to the other end 14-2 of the resonance circuit 14.

As an example, a power metal-oxide-semiconductor field-effect transistor (MOSFET) may be used as each of the switching elements 11S1, 11S2, 15S1, and 15S2. For instance, this example uses p-channel MOSFETs as the switching elements 11S1 and 15S1, and uses n-channel MOSFETs as the switching elements 11S2 and 15S2.

According to the control of the control unit 16, the signal generator 11 turns on and off the switching elements 11S1 and 11S2 in accordance with high and low sections of the first high-frequency signal desired to be generated, to thereby generate the first high-frequency signal adjusted in pulse width.

At the same time, according to the control of the control unit 16, the signal generator 15 turns on and off the switching elements 15S1 and 15S2 in accordance with high and low sections of the second high-frequency signal desired to be generated, to thereby generate the second high-frequency signal adjusted in pulse width and phase difference from the first high-frequency signal.

The control unit 16 thus causes the signal generator 11 to generate the first high-frequency signal having a predetermined pulse width. The control unit 16 further causes the signal generator 15 to generate the substantially square wave second high-frequency signal the same in period and amplitude as the first high-frequency signal, having a predetermined pulse width, and different in phase from the first high-frequency signal by a predetermined fraction of a fundamental wave period T.

In the present embodiment, the pulse width of the first and second high-frequency signals is set to 1/n (n represents a natural number) of the fundamental wave period T of the first and second high-frequency signals, and the phase difference between the first and second high-frequency signals is set to ½ of the fundamental wave period T. Further, the difference between the first and second high-frequency signals is taken to generate a composite signal. Thereby, at least one of harmonic components included in the first high-frequency signal is offset or reduced.

In the high-frequency power source 10A according to the present embodiment, the final stage for supplying the first and second high-frequency signals to the resonance circuit 14 may be configured the same as a full-bridge inverter. That is, it is possible to configure the first and second signal generating units by using a common circuit. Further, the first and second signal generating units are the same in circuit size. It is therefore possible to easily realize the present disclosure, and to achieve low cost despite the presence of two signal generating units.

Further, the high-frequency signals generated by the first and second signal generating units have the same amplitude voltage, and thus only one power source voltage is necessary for the first and second signal generating units.

These circuits of the high-frequency power source 10A may include an integrated circuit, such as a so-called microcontroller unit (MCU).

2. Description of Signal Waveform and Frequency Component

With reference to FIGS. 4 to 17, description will now be given of the first high-frequency signal Vo (main signal) generated by the signal generator 11, the second high-frequency signal Vc (cancellation signal) generated by the signal generator 15, and the composite signal Vo-Vc (differential signal) thereof.

Figure 4:
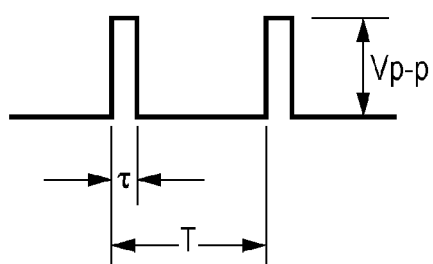
FIG. 4 is a diagram illustrating a square wave.
Figure 5:
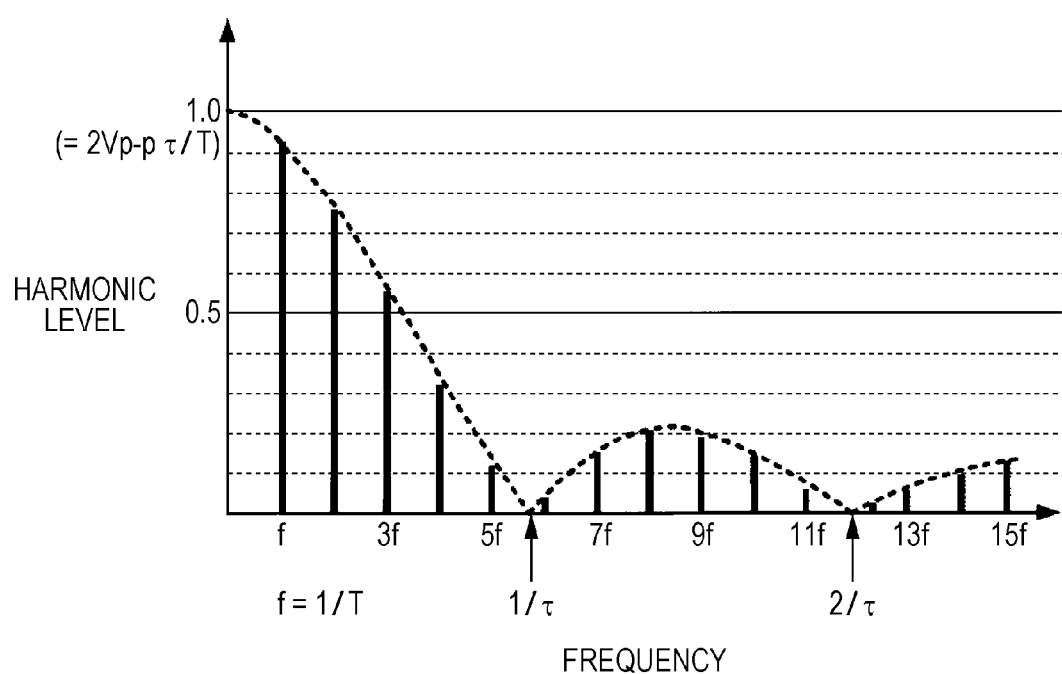
FIG. 5 is a diagram illustrating the absolute value of each frequency after Fast Fourier Transform of the square wave.

With reference to FIGS. 4 and 5, a square wave and a frequency spectrum thereof will first be described. FIG. 4 is a diagram illustrating a square wave. FIG. 5 is a diagram illustrating the absolute value of each frequency after Fast Fourier Transform of the square wave. In FIG. 5, the horizontal axis represents the frequency, and the vertical axis represents the absolute value (harmonic level) after Fast Fourier Transform.

The square wave as illustrated in FIG. 4 having a repetition period T and a pulse width τ has frequency characteristics of f=1/T as a fundamental wave and a harmonic component describing a sin c function illustrated in FIG. 5, which returns to zero with a period of 1/τ.

Figure 6A:
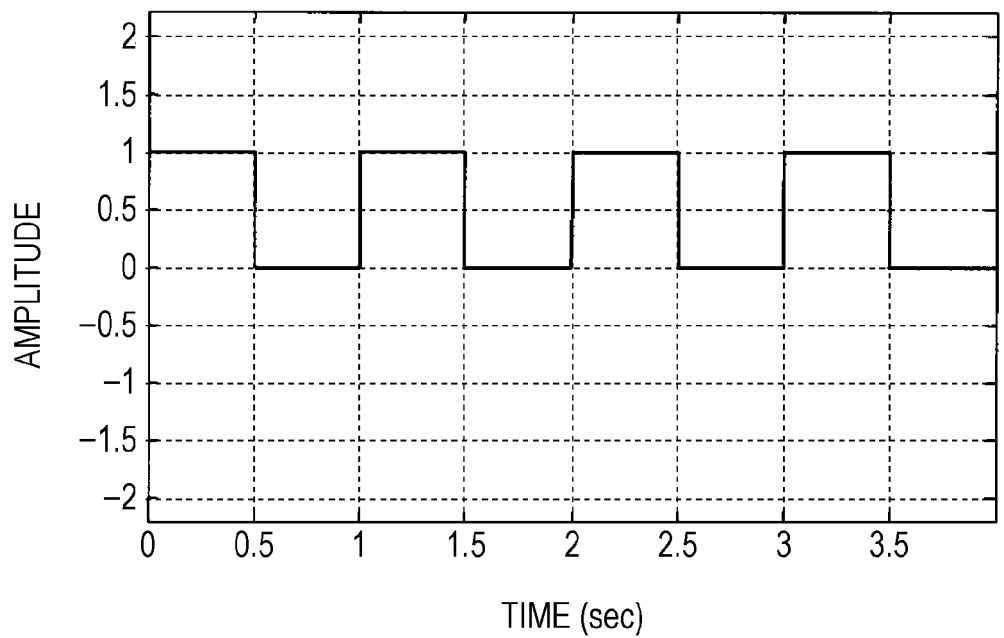
FIGS. 6A and 6B are a diagram illustrating the voltage of a high-frequency signal, and a diagram illustrating the absolute value of each frequency after Fast Fourier Transform, respectively.
Figure 6B:
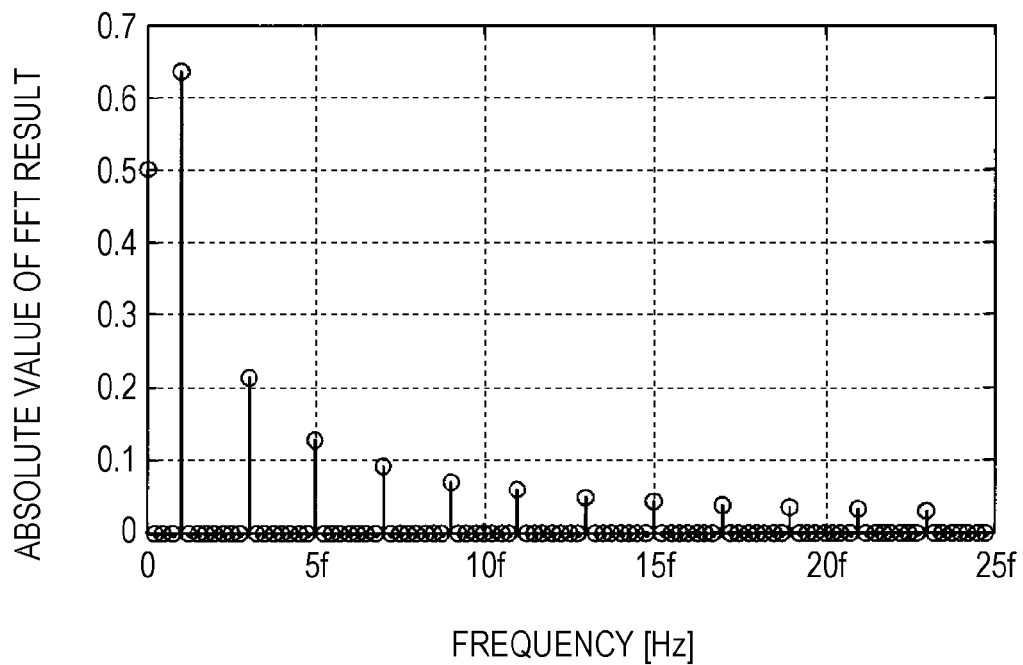

FIG. 6A is a diagram illustrating the voltage of a high-frequency signal, and FIG. 6B is a diagram illustrating the absolute value of each frequency after Fast Fourier Transform. In the waveform diagram of FIG. 6A, the horizontal axis represents the time (sec), and the vertical axis represents the amplitude value of the signal (voltage). In FIG. 6B, the horizontal axis represents the frequency (Hz), and the vertical axis represents the absolute value after Fast Fourier Transform.

As illustrated in FIGS. 6A and 6B, in the absolute value of each frequency after Fast Fourier Transform of the high-frequency signal having a duty ratio of ½, odd-order (first, third, fifth, seventh, ninth, and so forth) harmonic components are detected.

Figure 7A:
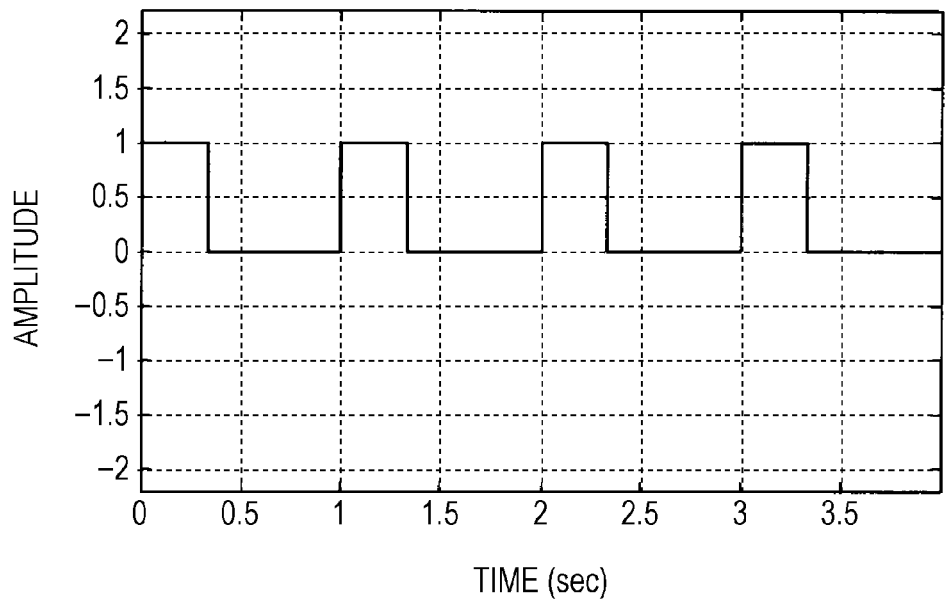
FIGS. 7A and 7B are a diagram illustrating a time waveform obtained by changing the duty ratio of the high-frequency signal in FIG. 6A, and a diagram illustrating the absolute value of each frequency after Fast Fourier Transform, respectively.

Herein, description will be given of a case in which the duty ratio of the high-frequency signal in FIG. 6A is changed to ⅓. FIG. 7A is a diagram illustrating a time waveform obtained by changing the duty ratio of the high-frequency signal in FIG. 6A, and FIG. 7B is a diagram illustrating the absolute value of each frequency after Fast Fourier Transform.

Figure 7B:
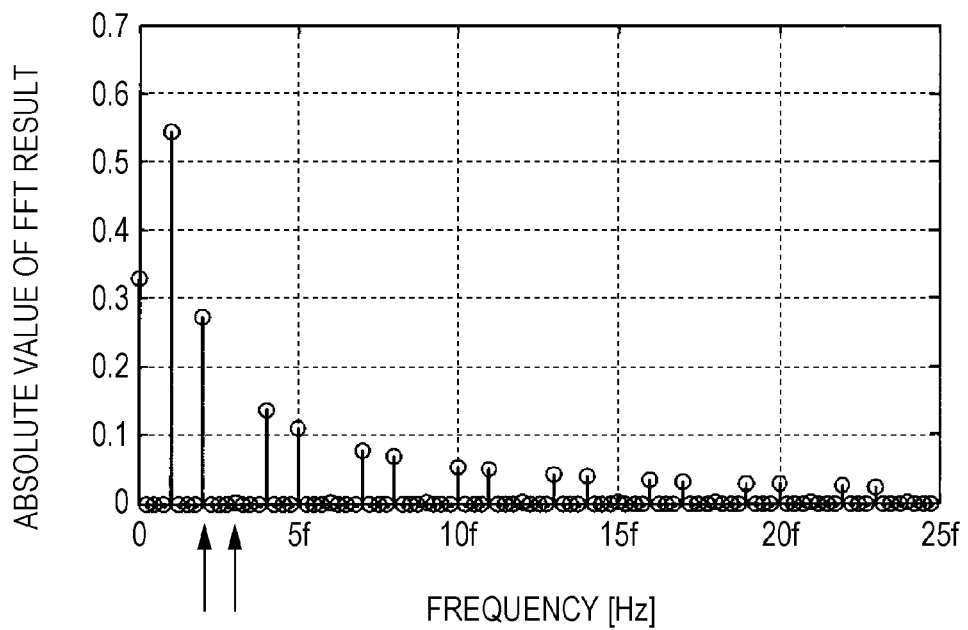

As illustrated in FIG. 7B, the third harmonic of the high-frequency signal is suppressed, but the second harmonic absent in the case of the duty ratio of ½ is generated.

A technique according to an embodiment of the present disclosure described below is capable of selectively suppressing a desired harmonic. Description will be given below of an example in which all even-order harmonics, the third harmonic, and the harmonics thereof are suppressed.

First Example of Suppression of Third Harmonic

Figure 8A:
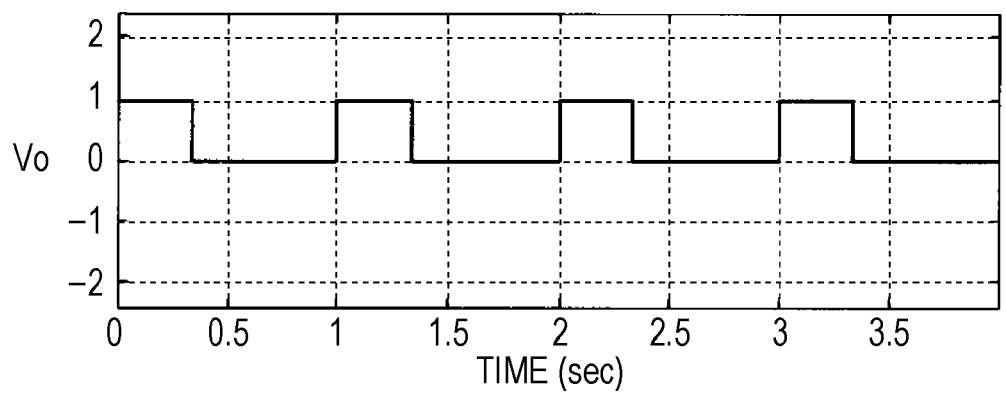
FIGS. 8A to 8C are diagrams illustrating an example (first example) of suppression of a third harmonic, FIG. 8A being a diagram illustrating a waveform of the voltage of a first high-frequency signal, FIG. 8B being a diagram illustrating a waveform of the voltage of a second high-frequency signal for cancellation, and FIG. 8C being a diagram illustrating a waveform of the voltage of a signal applied to a load.
Figure 8B:
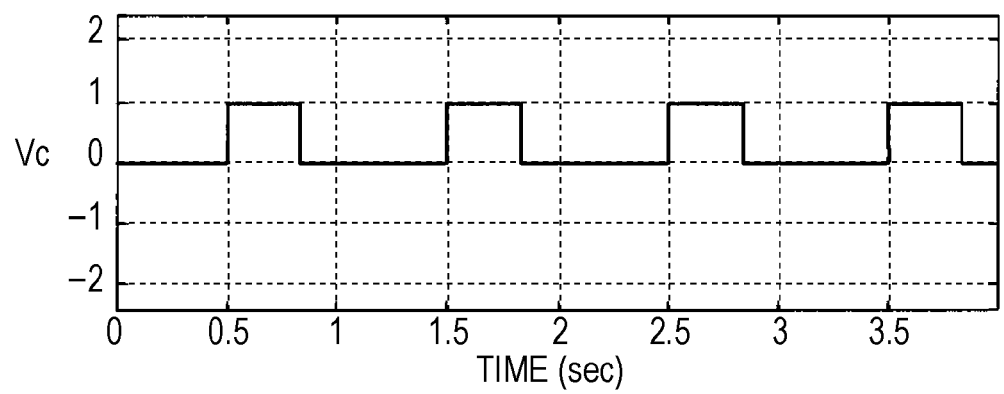
Figure 8C:
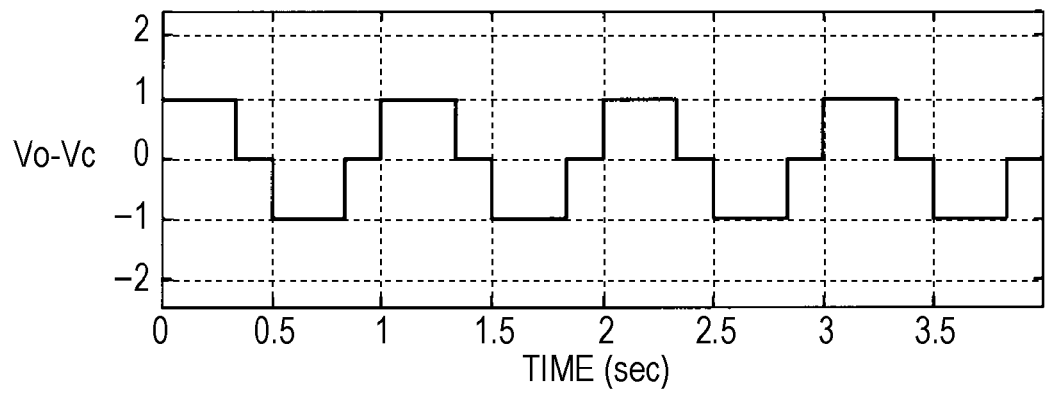

FIGS. 8A to 8C are diagrams illustrating an example (first example) of suppression of the third harmonic. FIG. 8A is a diagram illustrating a waveform of the voltage of the first high-frequency signal Vo. FIG. 8B is a diagram illustrating a waveform of the voltage of the second high-frequency signal Vc. FIG. 8C is a diagram illustrating a waveform of the voltage of the signal Vo-Vc applied to a load. In the waveform diagrams of FIGS. 8A to 8C, the horizontal axis represents the time (sec), and the vertical axis represents the amplitude value of the signal (voltage). The amplitude value of each signal is normalized with reference to the amplitude value of the first high-frequency signal Vo set to 1. The definitions of the horizontal axis and the vertical axis in the waveform diagrams are also the same in FIGS. 10A to 10C.

Herein, the pulse width of the first high-frequency signal Vo and the second high-frequency signal Vc is set to ⅓ of the fundamental wave period T, and the phase difference between the first high-frequency signal Vo and the second high-frequency signal Vc is set to ½ of the fundamental wave period T.

Figure 9:
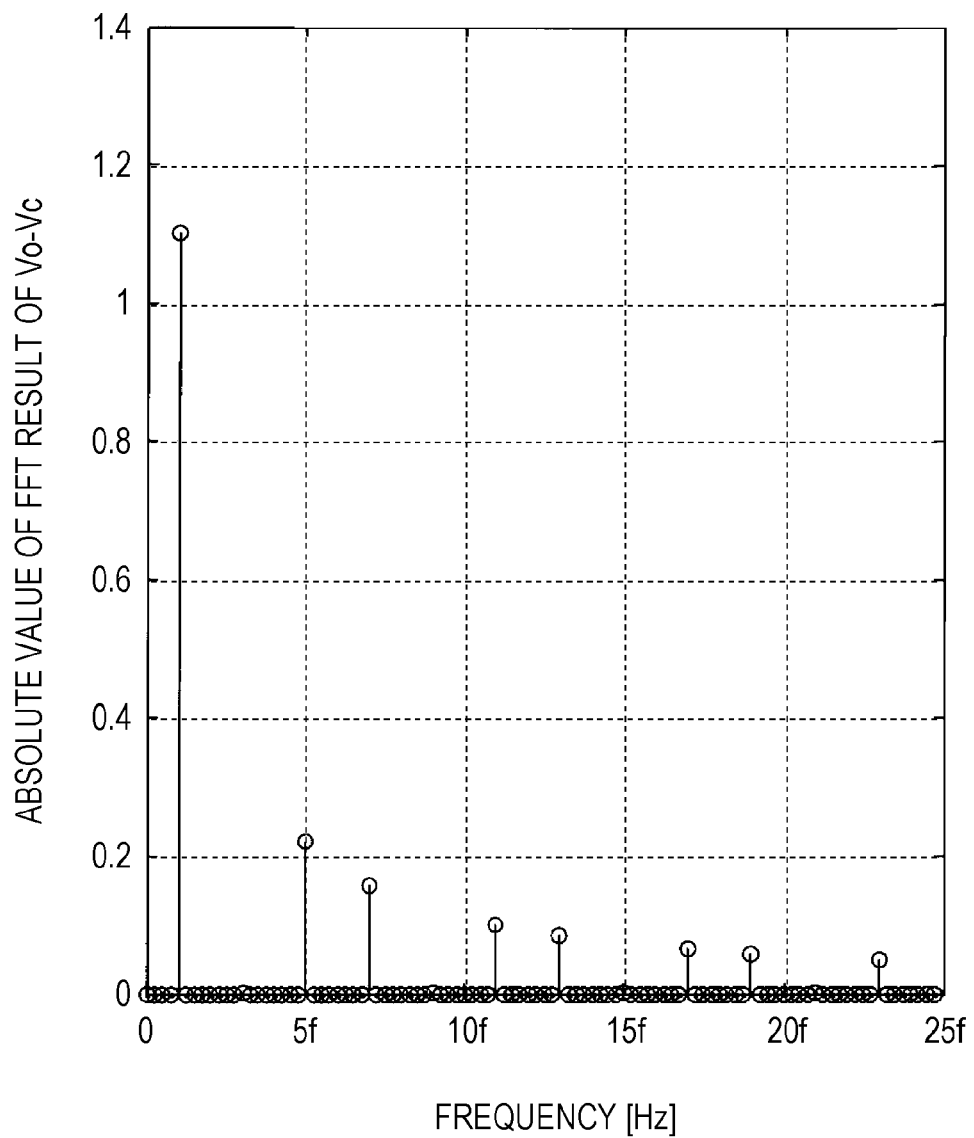
FIG. 9 is a diagram illustrating the absolute value of each frequency after Fast Fourier Transform of the signal in FIG. 8C.

FIG. 9 is a diagram illustrating the absolute value of each frequency after Fast Fourier Transform of the signal Vo-Vc in FIG. 8C. As illustrated in FIG. 9, the even-order harmonics, the third harmonic, and the harmonics thereof are suppressed for the following reason.

Figure 13:
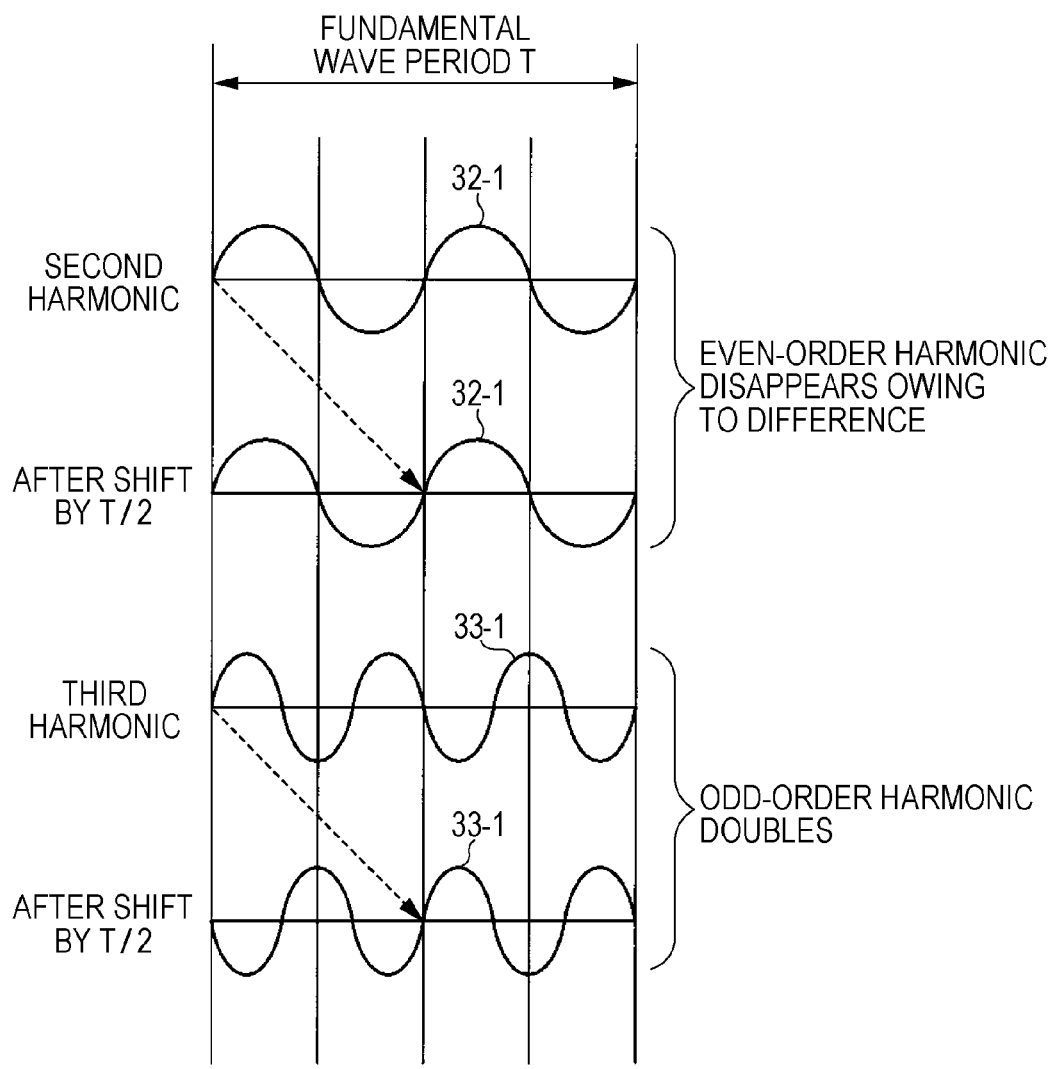
FIG. 13 is a diagram for describing a second harmonic and a third harmonic in a case in which a shift is made by half a fundamental wave period.

As illustrated in FIG. 13, even if the second high-frequency signal Vc is phase-shifted from the first high-frequency signal Vo by ½ of the fundamental wave period T, an even-order harmonic (third harmonic 32-1, for example) retains the same phase, and is offset or reduced by subtraction. Meanwhile, if the second high-frequency signal Vc is phase-shifted by ½ of the fundamental wave period T, an odd-order harmonic 33-1 is reversed in phase, and is doubled by subtraction.

Second Example of Suppression of Third Harmonic

Figure 10A:
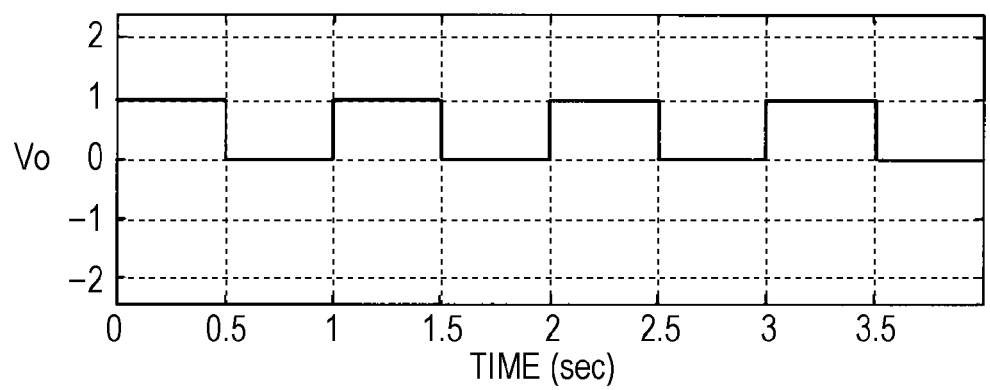
FIGS. 10A to 10C are diagrams illustrating an example (second example) of suppression of a third harmonic, FIG. 10A being a diagram illustrating a waveform of the voltage of the first high-frequency signal, FIG. 10B being a diagram illustrating a waveform of the voltage of the second high-frequency signal for cancellation, and FIG. 10C being a diagram illustrating a waveform of the voltage of the signal applied to a load.
Figure 10B:
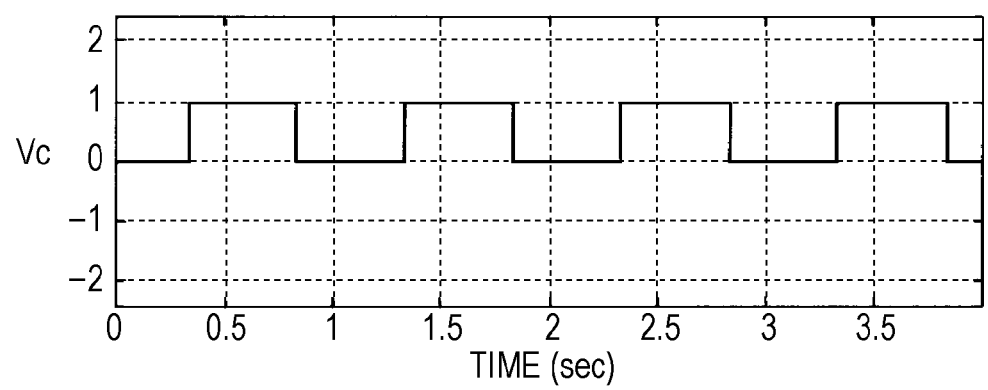
Figure 10C:
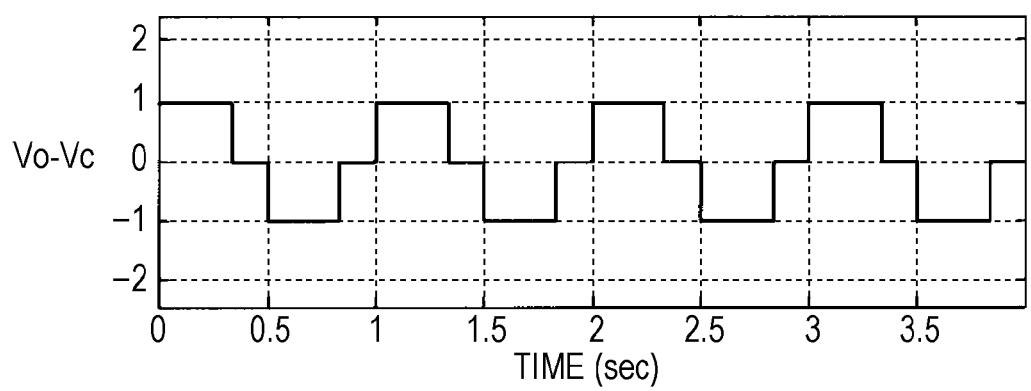

FIGS. 10A to 10C are diagrams illustrating an example (second example) of suppression of the third harmonic. FIG. 10A is a diagram illustrating a waveform of the voltage of the first high-frequency signal Vo. FIG. 10B is a diagram illustrating a waveform of the voltage of the second high-frequency signal Vc. FIG. 10C is a diagram illustrating a waveform of the voltage of the signal Vo-Vc applied to a load.

Herein, the pulse width of the first high-frequency signal Vo and the second high-frequency signal Vc is set to ½ of the fundamental wave period T, and the phase difference between the first high-frequency signal Vo and the second high-frequency signal Vc is set to ⅓ of the fundamental wave period T.

Figure 11:
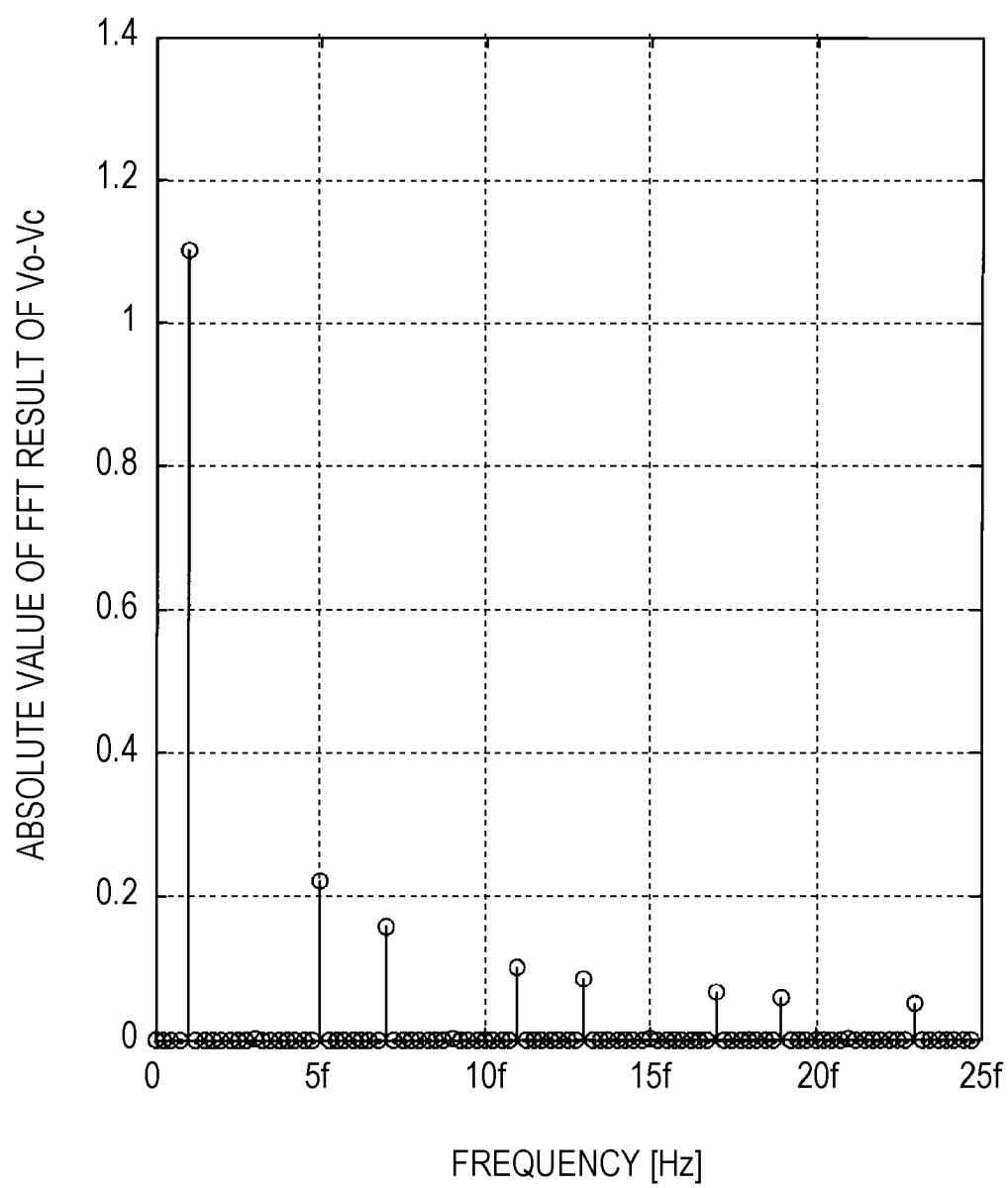
FIG. 11 is a diagram illustrating the absolute value of each frequency after Fast Fourier Transform of the signal in FIG. 10C.

FIG. 11 is a diagram illustrating the absolute value of each frequency after Fast Fourier Transform of the signal Vo-Vc in FIG. 10C. As illustrated in FIG. 11, the even-order harmonics, the third harmonic, and the harmonics thereof are suppressed.

The time waveforms of the signal Vo-Vc in the first and second examples of suppression of the third harmonic (FIGS. 8C and 10C) are the same. Therefore, the frequency spectra thereof are also the same.

Description of Phase Shift of High-Frequency Signal And Composite Waveform

A phase shift of a high-frequency signal and a composite waveform will now be described.

Figure 12A:
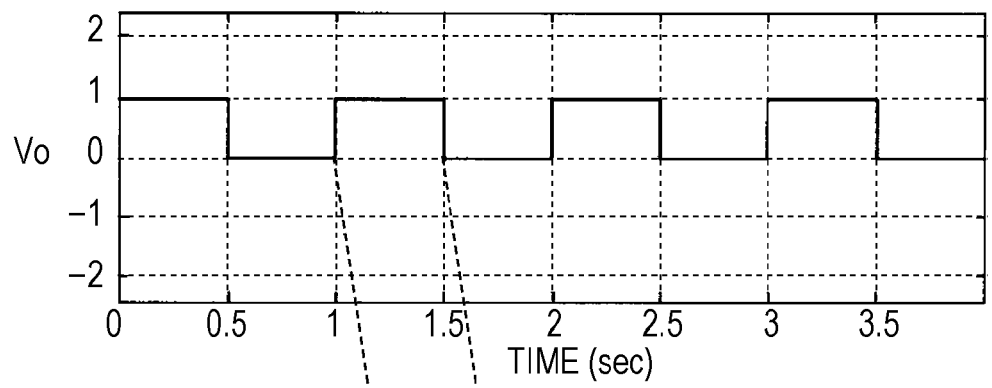
FIGS. 12A to 12C are diagrams for describing a phase shift of a high-frequency signal and a composite waveform.
Figure 12B:
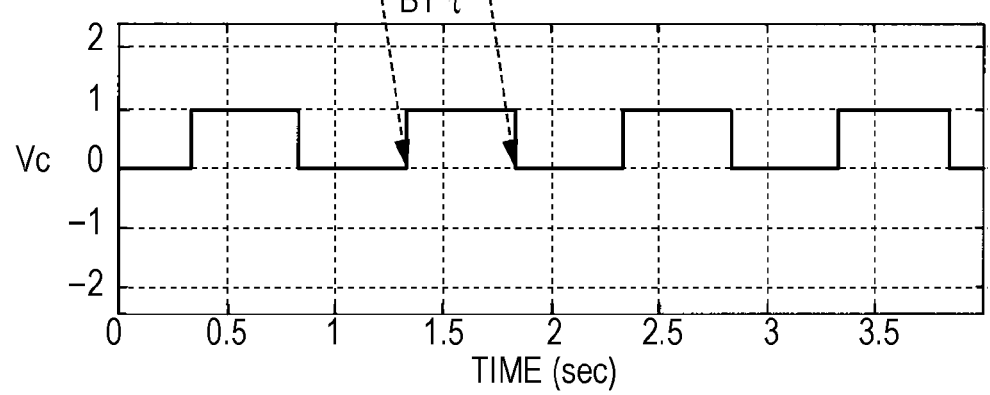
Figure 12C:
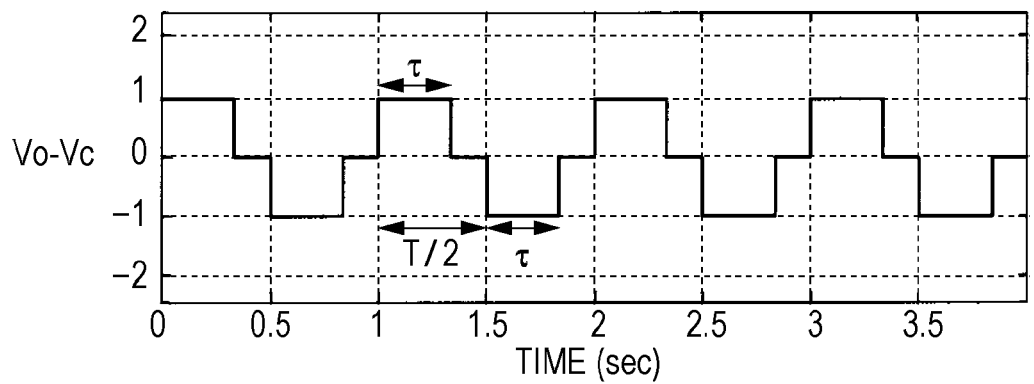

FIGS. 12A to 12C are diagrams for describing a phase shift of a high-frequency signal and a composite waveform. As illustrated in FIGS. 12A to 12C, it is understood that phase-shifting the second high-frequency signal Vc by a time τ and taking the difference thereof from the first high-frequency signal Vo results in "the same waveform as the waveform obtained by taking the difference of a signal with a pulse width τ and a time difference T/2." To suppress an odd-order harmonic corresponding to the (2n+1)th-order, therefore, a phase difference of T/(2n+1) may be provided between the first and second high-frequency signals.

Description will be given below of an example in which all even-order harmonics, the fifth harmonic, and the harmonics thereof are suppressed.

First Example of Suppression of Fifth Harmonic

Figure 14A:
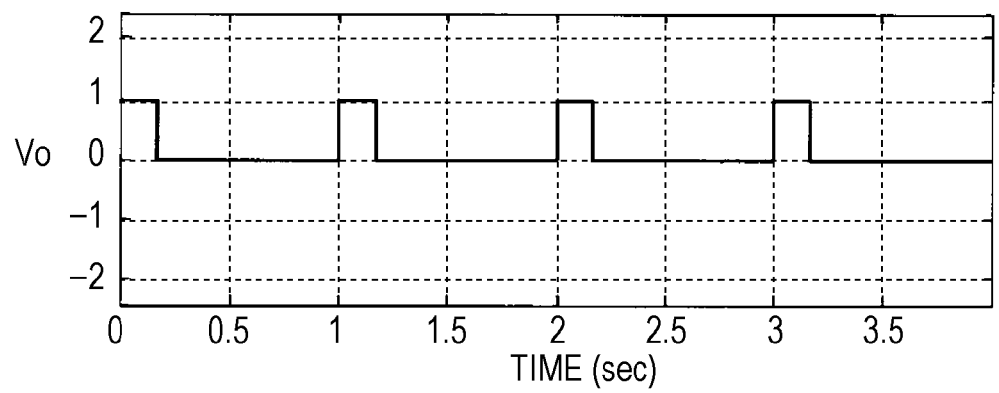
FIGS. 14A to 14C are diagrams illustrating an example (first example) of suppression of a fifth harmonic, FIG. 14A being a diagram illustrating a waveform of the voltage of the first high-frequency signal, FIG. 14B being a diagram illustrating a waveform of the voltage of the second high-frequency signal for cancellation, and FIG. 14C being a diagram illustrating a waveform of the voltage of the signal applied to a load.
Figure 14B:
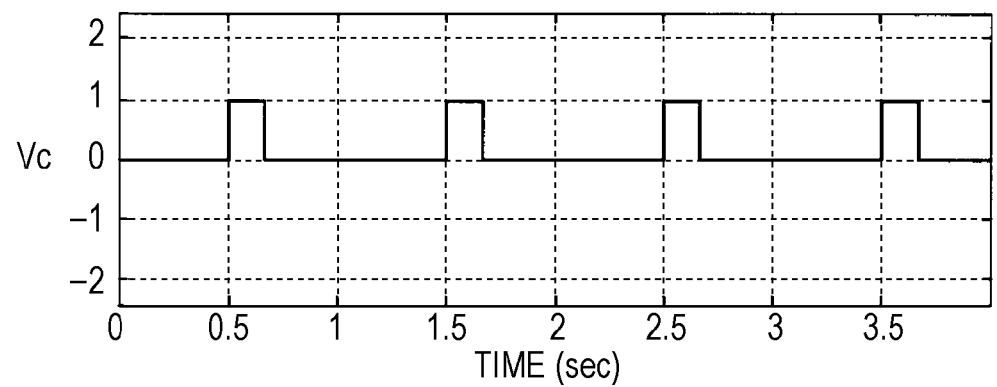
Figure 14C:
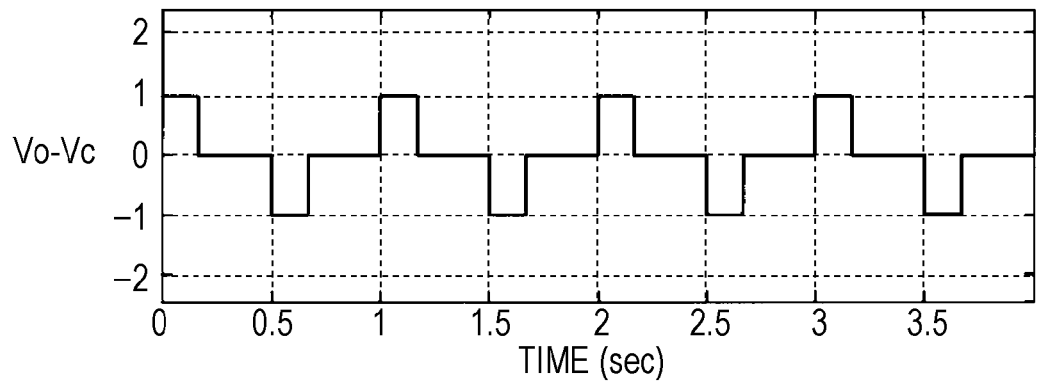

FIGS. 14A to 14C are diagrams illustrating an example (first example) of suppression of the fifth harmonic. FIG. 14A is a diagram illustrating a waveform of the voltage of the first high-frequency signal Vo. FIG. 14B is a diagram illustrating a waveform of the voltage of the second high-frequency signal Vc. FIG. 14C is a diagram illustrating a waveform of the voltage of the signal Vo-Vc applied to a load. In the waveform diagrams of FIGS. 14A to 14C, the horizontal axis represents the time (sec), and the vertical axis represents the amplitude value of the signal (voltage). The amplitude value of each signal is normalized with reference to the amplitude value of the first high-frequency signal Vo set to 1. The definitions of the horizontal axis and the vertical axis in the waveform diagrams are also the same in FIGS. 16A to 16C.

Herein, the pulse width of the first high-frequency signal Vo and the second high-frequency signal Vc is set to ⅕ of the fundamental wave period T, and the phase difference between the first high-frequency signal Vo and the second high-frequency signal Vc is set to ½ of the fundamental wave period T.

Figure 15:
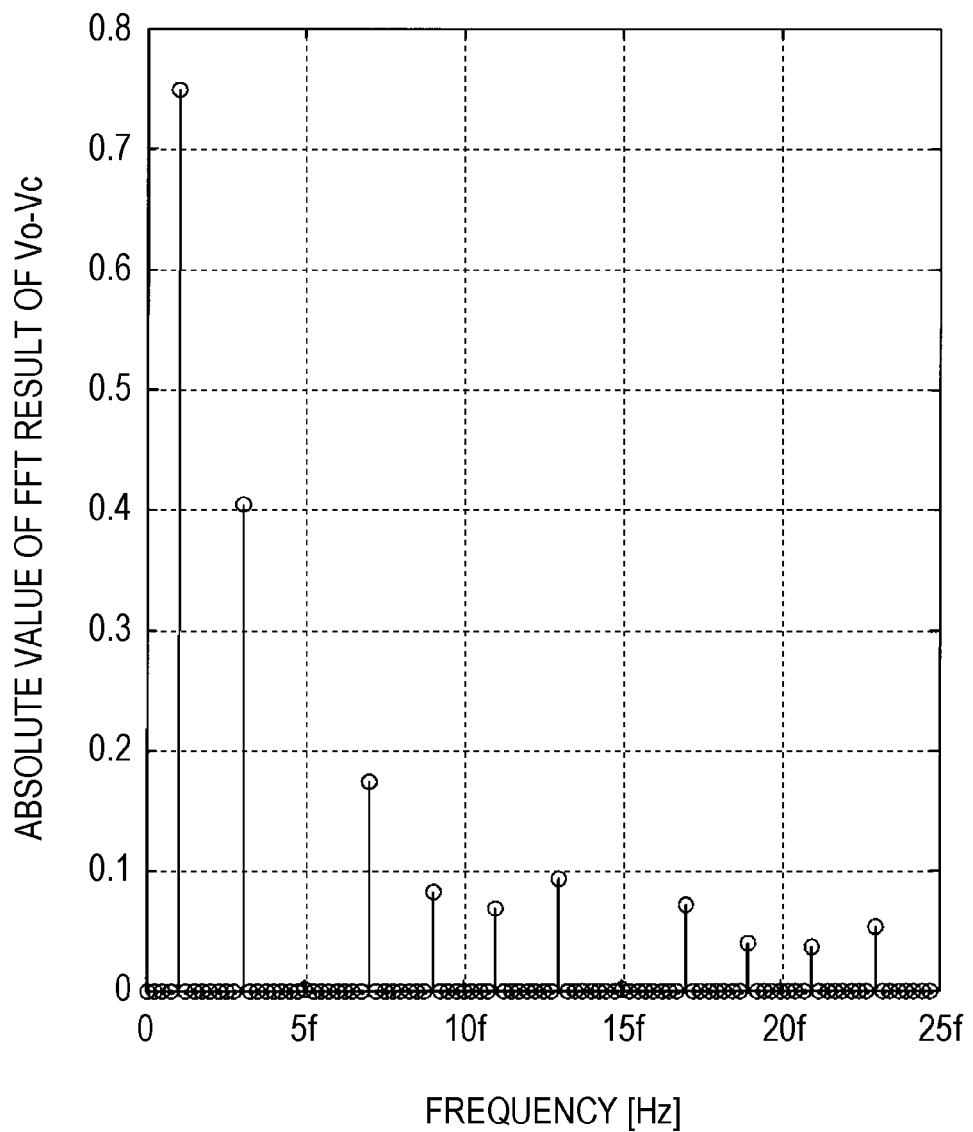
FIG. 15 is a diagram illustrating the absolute value of each frequency after Fast Fourier Transform of the signal in FIG. 14C.

FIG. 15 is a diagram illustrating the absolute value of each frequency after Fast Fourier Transform of the signal Vo-Vc in FIG. 14C. As illustrated in FIG. 15, the even-order harmonics, the fifth harmonic, and the harmonics thereof are suppressed.

Second Example of Suppression of Fifth Harmonic

Figure 16A:
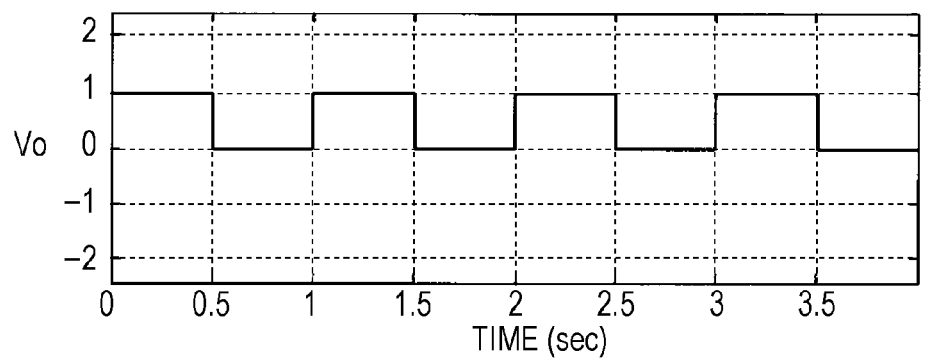
FIGS. 16A to 16C are diagrams illustrating an example (second example) of suppression of a fifth harmonic, FIG. 16A being a diagram illustrating a waveform of the voltage of the first high-frequency signal, FIG. 16B being a diagram illustrating a waveform of the voltage of the second high-frequency signal for cancellation, and FIG. 16C being a diagram illustrating a waveform of the voltage of the signal applied to a load.
Figure 16B:
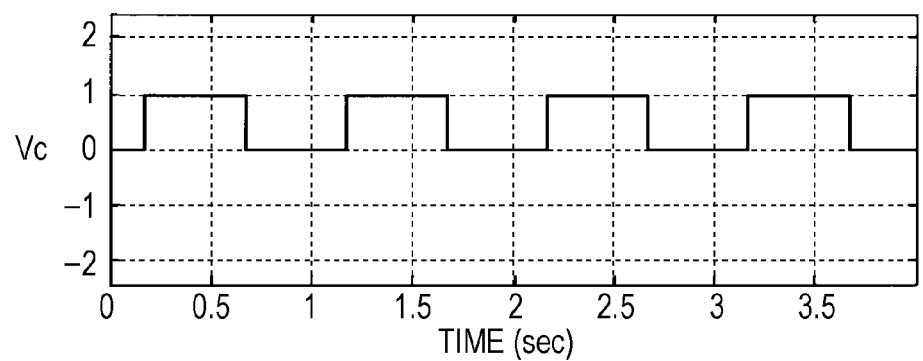
Figure 16C:
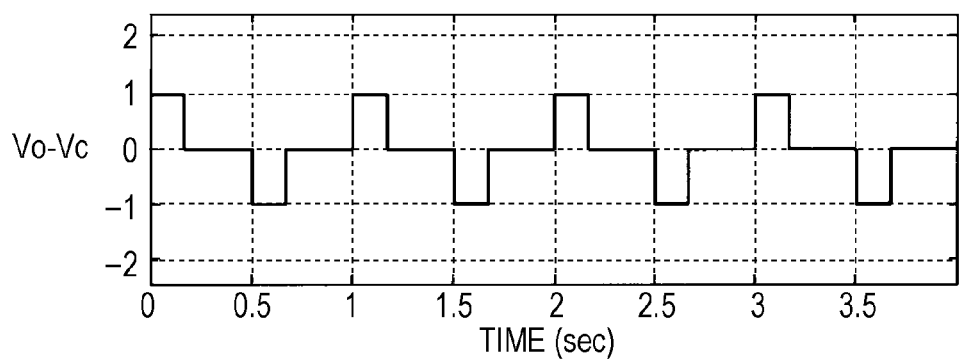

FIGS. 16A to 16C are diagrams illustrating an example (second example) of suppression of the fifth harmonic. FIG. 16A is a diagram illustrating a waveform of the voltage of the first high-frequency signal Vo. FIG. 16B is a diagram illustrating a waveform of the voltage of the second high-frequency signal Vc. FIG. 16C is a diagram illustrating a waveform of the voltage of the signal Vo-Vc applied to a load.

Herein, the pulse width of the first high-frequency signal Vo and the second high-frequency signal Vc is set to ½ of the fundamental wave period T, and the phase difference between the first high-frequency signal Vo and the second high-frequency signal Vc is set to ⅕ of the fundamental wave period T.

Figure 17:
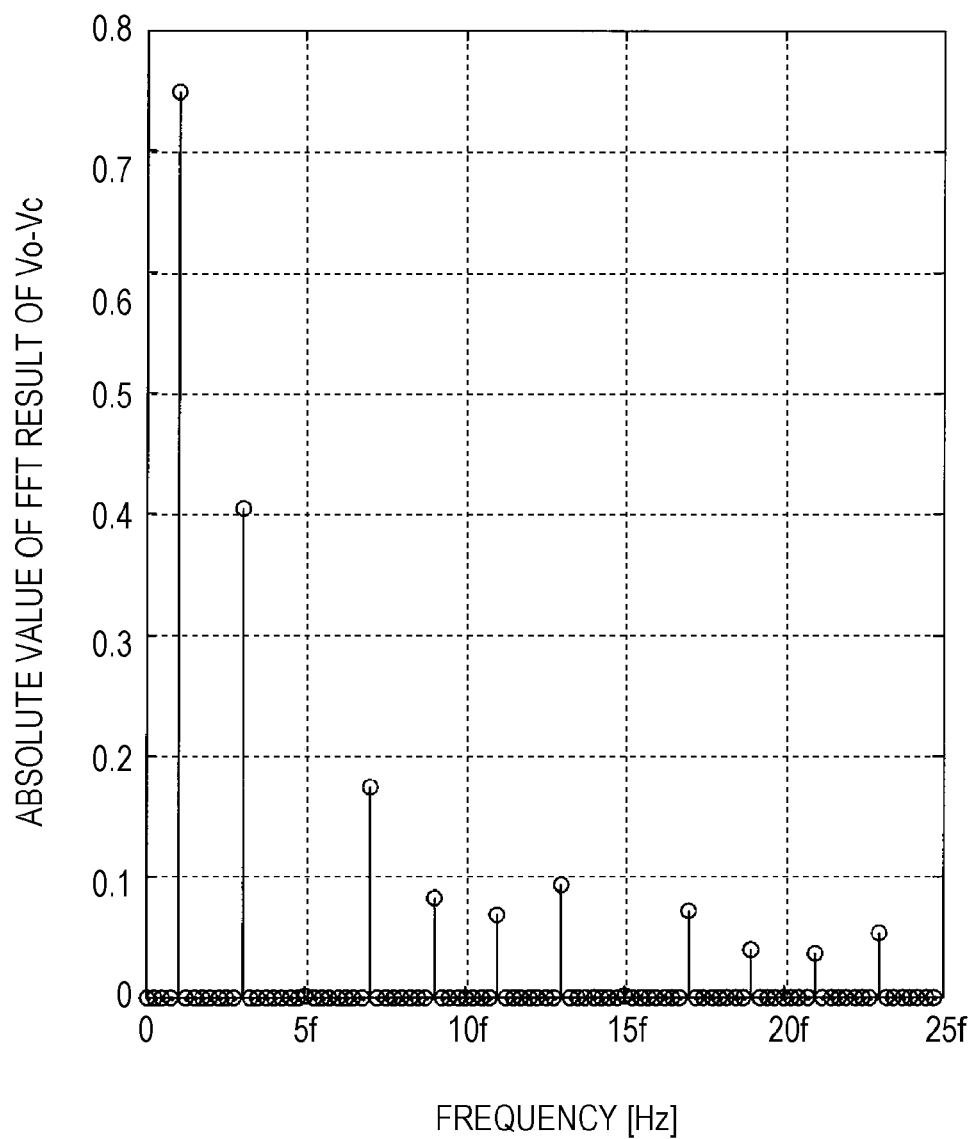
FIG. 17 is a diagram illustrating the absolute value of each frequency after Fast Fourier Transform of the signal in FIG. 16C.

FIG. 17 is a diagram illustrating the absolute value of each frequency after Fast Fourier Transform of the signal Vo-Vc in FIG. 16C. As illustrated in FIG. 17, the even-order harmonics, the fifth harmonic, and the harmonics thereof are suppressed.

The time waveforms of the signal Vo-Vc in the first and second examples of suppression of the fifth harmonic (FIGS. 14C and 16C) are the same. Therefore, the frequency spectra thereof are also the same.

The pulse width and the phase difference may also be set in a similar manner in a case in which another harmonic other than the third and fifth harmonics is suppressed.

According to the above-described embodiment, it is possible to offset or reduce a desired harmonic component in a composite signal of the first and second high-frequency signals by appropriately adjusting the pulse width of the first high-frequency signal, the pulse width of the second high-frequency signal, and the phase difference of the second high-frequency signal from the first high-frequency signal.

For example, it is now assumed that the pulse width of the first and second high-frequency signals is 1/n of the fundamental wave period T (n represents a natural number), and that the phase difference between the first and second high-frequency signals is ½ of the fundamental wave period T.

Alternatively, it is assumed that the pulse width of the first and second high-frequency signals is ½ of the fundamental wave period T, and that the phase difference between the first and second high-frequency signals is 1/n of the fundamental wave period T.

Herein, with a desired number set in the predetermined number n, it is possible to generate a high-frequency signal in which a desired harmonic is suppressed.

Therefore, in a case in which 6.78 MHz is set as the frequency of the fundamental wave, for example, it is possible to suppress the even-order harmonics, the third harmonic, and the harmonics thereof by setting the foregoing predetermined number n to 3. Accordingly, it is possible to generate a high-frequency signal in which the third harmonic (20.34 MHz) is suppressed, and which satisfies the standards of the ISM band.

As described above, according to the present embodiment, it is possible to selectively suppress unnecessary radiation due to a harmonic of the main signal, such as unnecessary radiation not satisfying the standards of telecommunications, for example.

In the first example of suppression of each of the above-described harmonics, the operation of devices for generating signals is slightly increased in speed owing to a reduction in duty ratio. In the second example of suppression of each of the harmonics, however, the duty ratio remains to be ½, and thus high-speed devices are unnecessary. In actual implementation, therefore, a system according to the second example of suppression is more preferable.

3. Configuration Example of Non-Contact Power Transmitting System

Figure 18:
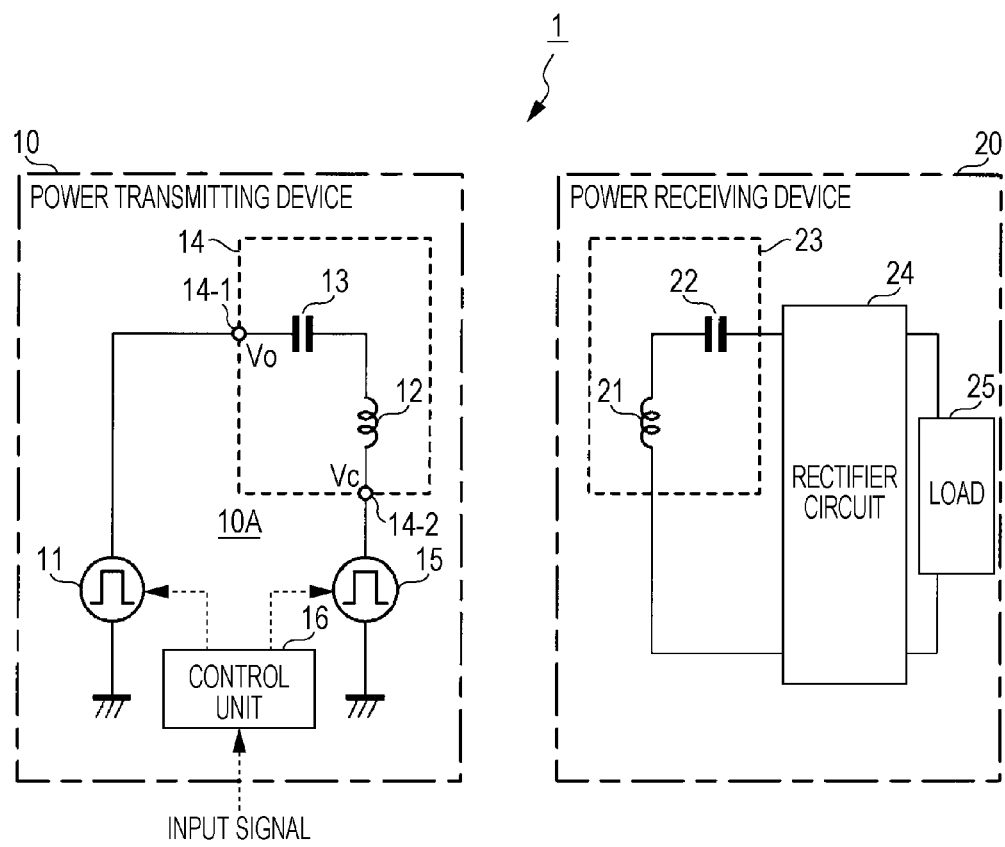
FIG. 18 is a schematic circuit diagram of a non-contact power transmitting system using the high-frequency power source according to the embodiment of the present disclosure.

FIG. 18 is a schematic circuit diagram of a non-contact power transmitting system using the high-frequency power source according to the embodiment of the present disclosure.

A non-contact power transmitting system 1 includes the power transmitting device 10 which transmits power in a non-contact manner (performs non-contact power feeding) by using a magnetic field, and a power receiving device 20 which receives power (from a magnetic flux) transmitted from the power transmitting device 10.

The power transmitting device 10 includes the high-frequency power source 10A, the resonance circuit 14 (an example of a load) supplied with a high-frequency signal output from the high-frequency power source 10A, and the control unit 16 which controls driving of the high-frequency power source 10A. An internal configuration and operation of the power transmitting device 10 are the same as those described with reference to FIGS. 2 to 17, and thus detailed description thereof will be omitted.

Meanwhile, the power receiving device 20 includes a power receiving coil 21 for receiving power from the power transmitting device 10 in a non-contact manner, a resonance capacitor 22 configuring a resonance circuit 23 together with the power receiving coil 21, a rectifier circuit 24 which converts an alternating-current signal supplied from the resonance circuit 23 to a direct-current signal, and a load 25. The load 25 includes, for example, a not-illustrated battery (secondary battery). The rectifier circuit 24 may be configured to perform a smoothing process, in addition to a rectifying process.

In the resonance circuit 23, the power receiving coil 21 and the resonance capacitor 22 are connected to form a series resonance circuit, and the inductance value of the power receiving coil 21 and the capacitance value of the resonance capacitor 22 are adjusted such that the resonance circuit 23 resonates at a feeding frequency. The higher is the power transmitted by the power transmitting device 10 (primary side), the higher is the power receivable by the power receiving device 20 (secondary side). The configuration of the resonance circuit 23 is not limited to this example, and the resonance circuit 23 may employ a variety of configurations similarly to the resonance circuit 14 of the power transmitting device 10.

A wireless power feeding system (non-contact power transmitting system) transmits power from a power transmitting device to a power receiving device in a non-contact manner. Thus, a coil of a resonance circuit discharges a large magnetic flux (magnetic field), which tends to increase unnecessary radiation. Meanwhile, the non-contact power transmitting system according to the present embodiment employs a configuration in which the power transmitting device takes the difference between the first and second high-frequency signals to offset or reduce a specific harmonic component. Accordingly, it is possible to eliminate a specific harmonic component from a power transmission signal output by the power transmitting device, to thereby suppress radiation of an unnecessary frequency component.

A magnetic field resonance-type non-contact power transmitting system, in which the load of the power transmitting device is the resonance circuit, has a certain filtering effect of suppressing a harmonic component, but the effect is limited. With the application of the technique according to the embodiment of the present disclosure, it is possible to more effectively eliminate a harmonic component from the power transmission signal output by the power transmitting device, to thereby suppress unnecessary radiation.

Further, the magnetic field resonance-type non-contact power transmitting system has a feature of being capable of performing highly efficient power transmission. In this regard, the technique according to the embodiment of the present disclosure, which does not use a sine wave signal that tends to be reduced in efficiency, is considered suitable for the magnetic field resonance-type non-contact power transmitting system.

4. Modified Examples

In the implementation of the above-described high-frequency power source (the high-frequency power source 10A, for example), the waveform output from each of the signal generating units may fail to have an ideal square shape. In that case, the suppression amount may be optimized by fine-tuning the pulse width or phase of the high-frequency signal. For example, when the amplitude of the high-frequency signal is set to ⅓, the amplitude may be set not exactly to ⅓ (=0.33 . . . ) but to 0.3 in accordance with the device for implementation.

Further, although the half-bridge inverter is applied to each of the first and second signal generating units in the above-described embodiment, the technique according to the embodiment of the present disclosure is also applicable to another type of signal generator which outputs a square wave.

The present disclosure may also employ the following configurations:

(1) A power transmitting device including: a resonance circuit used in non-contact power transmission; a first signal generating unit connected to one end of the resonance circuit, and configured to generate, with the use of a switching system, a first high-frequency signal including one or more harmonic components; and a second signal generating unit connected to an other end of the resonance circuit, and configured to generate, with the use of a switching system, a second high-frequency signal including a specific harmonic component, in which the first high-frequency signal is adjusted in pulse width and input to the one end of the resonance circuit, and the second high-frequency signal is adjusted in pulse width and phase difference from the first high-frequency signal and input to the other end of the resonance circuit.

(2) The power transmitting device according to (1), in which the pulse width of the first high-frequency signal and the second high-frequency signal is set to 1/n of a fundamental wave period T (n represents a natural number), and in which the phase difference between the first high-frequency signal and the second high-frequency signal is set to ½ of the fundamental wave period T.

(3) The power transmitting device according to (1) or (2), in which the specific harmonic component included in the second high-frequency signal corresponds to at least one of the harmonic components included in the first high-frequency signal.

(4) The power transmitting device according to one of (1) to (3), in which the first high-frequency signal and the second high-frequency signal have a substantially square wave.

(5) The power transmitting device according to one of (2), (3), and (4), in which the pulse width of the first high-frequency signal and the second high-frequency signal is set to ½ of a fundamental wave period T, and in which the phase difference between the first high-frequency signal and the second high-frequency signal is set to 1/n of the fundamental wave period T (n represents a natural number).

(6) A non-contact power transmitting system including: a power transmitting device configured to transmit power in a non-contact manner; and a power receiving device configured to receive power from the power transmitting device, in which the power transmitting device includes a resonance circuit used in non-contact power transmission, a first signal generating unit connected to one end of the resonance circuit, and configured to generate, with the use of a switching system, a first high-frequency signal including one or more harmonic components, and a second signal generating unit connected to an other end of the resonance circuit, and configured to generate, with the use of a switching system, a second high-frequency signal including a specific harmonic component, and in which the first high-frequency signal is adjusted in pulse width and input to the one end of the resonance circuit, and the second high-frequency signal is adjusted in pulse width and phase difference from the first high-frequency signal and input to the other end of the resonance circuit.

(7) A signal generating method including: causing a first signal generating unit to generate, with the use of a switching system, a first high-frequency signal including one or more harmonic components and adjusted in pulse width; causing a second signal generating unit to generate, with the use of a switching system, a second high-frequency signal including a specific harmonic component and adjusted in pulse width and phase difference from the first high-frequency signal; and differentially driving the first high-frequency signal and the second high-frequency signal, to thereby generate a composite signal thereof.

A series of processes in the above-described examples of embodiments may be executed by hardware or software. In the case of executing the series of processes by software, the series of processes is executable by a computer having special hardware incorporated with a program configuring the software or by a computer installed with a program for executing a variety of functions. For example, a program configuring desired software may be installed in and executed by a general-purpose personal computer or the like.

Further, in the present specification, the processing steps describing time-series processes include, let alone processes performed time-serially in the order of description, processes performed not necessarily time-serially but in parallel or individually (parallel processes or processes by objects, for example).

The present disclosure contains subject matter related to that disclosed in Japanese Priority Patent Application JP 2012-095781 filed in the Japan Patent Office on Apr. 19, 2012, the entire contents of which are hereby incorporated by reference.

Needless to say, the present disclosure is not limited to the above-described embodiments, and various modification examples and application examples are possible, without departing from the gist of the claims.

That is, in the above-described examples of embodiments, which are preferable specific examples of the present disclosure, a variety of technically preferable limitations are made. The technical scope of the present disclosure, however, is not limited to these embodiments, unless the description includes a specific statement limiting the present disclosure. For example, the material used and the amount thereof, the processing time, the order of processes, numeral conditions of parameters, and so forth included in the above description are merely preferable examples, and the sizes, shapes, and arrangement relationships in the drawings used in the description are schematic.

What is claimed is:

1. A power transmitting device comprising:
a resonance circuit used in non-contact power transmission;
a first signal generating unit connected to one end of the resonance circuit, and configured to generate, with the use of a switching system, a first high-frequency signal including one or more harmonic components; and
a second signal generating unit connected to an other end of the resonance circuit, and configured to generate, with the use of another switching system, a second high-frequency signal including a specific harmonic component, wherein the first high-frequency signal is adjusted in pulse width to a predetermined pulse width and input to the one end of the resonance circuit, and the second high-frequency signal is adjusted in pulse width to the predetermined pulse width and phase difference from the first high-frequency signal and input to the other end of the resonance circuit,
wherein the predetermined pulse width is set to 1/n of a fundamental wave period T, where n represents a natural number,
wherein the phase difference between the first high-frequency signal and the second high-frequency signal is set to ½ of the fundamental wave period T, and
wherein the specific harmonic component included in the second high-frequency signal is substantially equal to at least one of the harmonic components included in the first high-frequency signal.

2. The power transmitting device according to claim 1, wherein the first high-frequency signal and the second high-frequency signal have a substantially square wave.

3. The power transmitting device according to claim 1,
wherein the pulse width of the first high-frequency signal and the second high-frequency signal is set to ½ of the fundamental wave period T, and
wherein the phase difference between the first high-frequency signal and the second high-frequency signal is set to 1/n of the fundamental wave period T, where n represents a natural number.

4. A non-contact power transmitting system comprising:
a power transmitting device configured to transmit power in a non-contact manner; and
a power receiving device configured to receive power from the power transmitting device,
wherein the power transmitting device includes:
a resonance circuit used in non-contact power transmission,
a first signal generating unit connected to one end of the resonance circuit, and configured to generate, with the use of a switching system, a first high-frequency signal including one or more harmonic components, and
a second signal generating unit connected to an other end of the resonance circuit, and configured to generate, with the use of another switching system, a second high-frequency signal including a specific harmonic component, and
wherein the first high-frequency signal is adjusted in pulse width to a predetermined pulse width and input to the one end of the resonance circuit, and the second high-frequency signal is adjusted in pulse width to the predetermined pulse width and phase difference from the first high-frequency signal and input to the other end of the resonance circuit, and
wherein the specific harmonic component included in the second high-frequency signal is substantially equal to at least one of the harmonic components included in the first high-frequency signal.

5. A signal generating method comprising:
causing a first signal generating unit to generate, with the use of a switching system, a first high-frequency signal including one or more harmonic components and adjusted in pulse width to a predetermined pulse width;
causing a second signal generating unit to generate, with the use of another switching system, a second high-frequency signal including a specific harmonic component and adjusted in pulse width to the predetermined pulse width and phase difference from the first high-frequency signal; and
differentially driving the first high-frequency signal and the second high-frequency signal, to thereby generate a composite signal thereof, wherein the specific harmonic component in the second high-frequency signal is substantially equal to at least one of the harmonic components in the first high-frequency signal.

6. The signal generating method according to claim 5,
wherein the predetermined pulse width is set to 1/n of a fundamental wave period T, where n represents a natural number, and
wherein the phase difference between the first high-frequency signal and the second high-frequency signal is set to ½ of the fundamental wave period T.

7. The signal generating method according to claim 5, wherein the first high-frequency signal and the second high-frequency signal have a substantially square wave.

8. The signal generating method according to claim 5,
wherein the pulse width of the first high-frequency signal and the second high-frequency signal is ½ of a fundamental wave period T, and
wherein the phase difference between the first high-frequency signal and the second high-frequency signal is set to 1/n of the fundamental wave period T, wherein n represents a natural number.

* * * * *